(12) United States Patent
Long et al.

(10) Patent No.: US 12,061,253 B2
(45) Date of Patent: Aug. 13, 2024

(54) DEPTH MAP GENERATION

(71) Applicants: Ford Global Technologies, LLC, Dearborn, MI (US); Board of Trustees of Michigan State University, East Lansing, MI (US)

(72) Inventors: Yunfei Long, East Lansing, MI (US); Daniel Morris, Okemos, MI (US); Xiaoming Liu, Okemos, MI (US); Marcos Paul Gerardo Castro, Mountainview, CA (US); Praveen Narayanan, San Jose, CA (US); Punarjay Chakravarty, Campbell, CA (US)

(73) Assignees: Ford Global Technologies, LLC, Dearborn, MI (US); Board of Trustees of Michigan State University, East Lansing, MI (US)

( * ) Notice: Subject to any disclaimer, the term of this patent is extended or adjusted under 35 U.S.C. 154(b) by 499 days.

(21) Appl. No.: 17/337,664

(22) Filed: Jun. 3, 2021

(65) Prior Publication Data

US 2022/0390591 A1 Dec. 8, 2022

(51) Int. Cl.
| | |
|---|---|
| *G06T 7/00* | (2017.01) |
| *G01B 15/00* | (2006.01) |
| *G01S 13/89* | (2006.01) |
| *G01S 13/931* | (2020.01) |
| *G06T 7/579* | (2017.01) |

(52) U.S. Cl.
CPC .............. *G01S 13/89* (2013.01); *G01B 15/00* (2013.01); *G01S 13/931* (2013.01); *G06T 7/579* (2017.01); *G06T 2207/10028* (2013.01); *G06T 2207/20081* (2013.01); *G06T 2207/20084* (2013.01); *G06T 2207/30252* (2013.01)

(58) Field of Classification Search
None
See application file for complete search history.

(56) References Cited

U.S. PATENT DOCUMENTS

| | | | |
|---|---|---|---|
| 10,580,158 B1 | 3/2020 | Mousavian et al. | |
| 11,062,454 B1* | 7/2021 | Cohen ..................... | G01S 7/417 |
| 2019/0353791 A1 | 11/2019 | Vignard et al. | |
| 2020/0160559 A1 | 5/2020 | Urtasun et al. | |
| 2020/0210726 A1 | 7/2020 | Yang et al. | |
| 2021/0012165 A1 | 1/2021 | Jiang | |

(Continued)

*Primary Examiner* — James M McPherson
(74) *Attorney, Agent, or Firm* — Frank A. MacKenzie; Bejin Bieneman PLC (57) ABSTRACT

A computer includes a processor and a memory storing instructions executable by the processor to receive radar data from a radar, the radar data including radar pixels having respective measured depths; receive camera data from a camera, the camera data including an image frame including camera pixels; map the radar pixels to the image frame; generate respective regions of the image frame surrounding the respective radar pixels; for each region, determine confidence scores for the respective camera pixels in that region; output a depth map of projected depths for the respective camera pixels based on the confidence scores; and operate a vehicle including the radar and the camera based on the depth map. The confidence scores indicate confidence in applying the measured depth of the radar pixel for that region to the respective camera pixels.

20 Claims, 5 Drawing Sheets

(56) References Cited

U.S. PATENT DOCUMENTS

| | | | |
|---|---|---|---|
| 2021/0026355 A1* | 1/2021 | Chen | G06F 18/22 |
| 2021/0082135 A1* | 3/2021 | Xu | G06T 5/77 |
| 2022/0091254 A1* | 3/2022 | Berry | G01S 13/865 |
| 2022/0111839 A1* | 4/2022 | Jiang | G06T 7/593 |
| 2022/0155451 A1* | 5/2022 | Bacchus | G01S 17/931 |
| 2022/0230364 A1* | 7/2022 | Choi | G06V 10/16 |

* cited by examiner

DEPTH MAP GENERATION

BACKGROUND

Vehicles are typically equipped with one or more cameras and one or more radars. Cameras can detect electromagnetic radiation in some range of wavelengths. For example, cameras may detect visible light, infrared radiation, ultraviolet light, or some range of wavelengths including visible, infrared, and/or ultraviolet light. Radars transmit radio waves and receive reflections of those radio waves to detect physical objects in the environment. Radars can use direct propagation, i.e., measuring time delays between transmission and reception of radio waves, or indirect propagation, i.e., Frequency Modulated Continuous Wave (FMCW) method, i.e., measuring changes in frequency between transmitted and received radio waves.

DETAILED DESCRIPTION

The systems and methods described herein include generation of a dense depth map using data from a camera and a radar on board a vehicle. For the purposes of this document, a "depth map" is defined as an image, i.e., a set of image data, that contains information relating to the distance of surfaces of scene objects from a viewpoint, typically by specifying distances of surfaces represented by pixels from the viewpoint. The vehicle can use the depth map for operating autonomously or semi-autonomously.

The system combines data from the camera and the radar to generate dense data, i.e., data representing more rather than fewer points representing an area or volume of the real world, about distances to objects in the scene, e.g., at a density of the camera pixels. The radar generally produces radar data that is significantly sparser than camera data from the camera, i.e., radar pixels that include distances to objects are farther apart than camera pixels included in an image frame from the camera. The camera does not directly detect distances to objects in the scene. However, the system herein uses the data from the camera and the radar to produce the depth map with significantly higher density of distance data than the radar data. Moreover, the depth map has a high accuracy. Advantageously, the depth map can be generated without using a LIDAR, which typically detects distance data about a scene at a higher density than the radar alone while imposing significant additional architectural and processing requirements.

A computer includes a processor and a memory storing instructions executable by the processor to receive radar data from a radar, the radar data including radar pixels having respective measured depths; receive camera data from a camera, the camera data including an image frame including camera pixels; map the radar pixels to the image frame; generate respective regions of the image frame surrounding the respective radar pixels; for each region, determine confidence scores for the respective camera pixels in that region; and output a depth map of projected depths for the respective camera pixels based on the confidence scores. The confidence scores indicate confidence in applying the measured depth of the radar pixel for that region to the respective camera pixels.

The instructions may further include instructions to operate a vehicle including the radar and the camera based on the depth map.

The instructions may further include instructions to generate a plurality of depth images corresponding to respective confidence thresholds, each depth image indicating depths for the camera pixels that have confidence scores above the confidence threshold of that depth image. Outputting the depth map may be based on the depth images. Outputting the depth map may include executing a trained network, and inputs to the trained network may include the radar pixels, the image frame, and the depth images.

The confidence thresholds may be preset and mutually different.

A number of the plurality of depth images may be preset.

Determining the confidence scores may include executing a trained network. Inputs to the trained network may include the radar pixels, the image frame, optical flow, and radar flow. A smaller difference between the optical flow and the radar flow at a first camera pixel of the camera pixels may increase a likelihood of the trained network determining a higher confidence score for the first camera pixel.

The radar pixels and the radar flow may be accumulated over a time interval. The image frame may be a first image frame, the camera data may include a second image frame, and the optical flow may represent a scene shift between the first image frame and the second image frame.

The trained network may be a convolutional neural network.

The regions may have preset positions in the image frame relative to the respective radar pixels. The regions may each be a preset shape in the image frame, and the preset shape may have a greater height than width.

The regions may each be a preset shape in the image frame, and the preset shape may extend a greater distance vertically upward than downward from the respective radar pixel.

Outputting the depth map may include executing a trained network.

The radar data may be single-row data.

The radar pixels after mapping to the image frame may be sparser horizontally across the image frame than the camera pixels are.

A method includes receiving radar data from a radar, the radar data including radar pixels having respective measured depths; receiving camera data from a camera, the camera data including an image frame including camera pixels; mapping the radar pixels to the image frame; generating respective regions of the image frame surrounding the respective radar pixels; for each region, determining confidence scores for the respective camera pixels in that region; and outputting a depth map of projected depths for the respective camera pixels based on the confidence scores. The confidence scores indicate confidence in applying the measured depth of the radar pixel for that region to the respective camera pixels.

With reference to the Figures, wherein like numerals indicate like parts throughout the several views, a computer 102 includes a processor and a memory storing instructions executable by the processor to receive radar data from a radar 114, the radar data including radar pixels 116 having respective measured depths; receive camera data from a camera 112, the camera data including an image frame 118 including camera pixels 120; map the radar pixels 116 to the image frame 118; generate respective regions 122 of the image frame 118 surrounding the respective radar pixels 116; for each region 122, determine confidence scores for the respective camera pixels 120 in that region 122; output a depth map 126 of projected depths for the respective camera pixels 120 based on the confidence scores; and operate a vehicle 100 including the radar 114 and the camera 112 based on the depth map 126. The confidence scores indicate confidence in applying the measured depth of the radar pixel 116 for that region 122 to the respective camera pixels 120.

Figure 1:
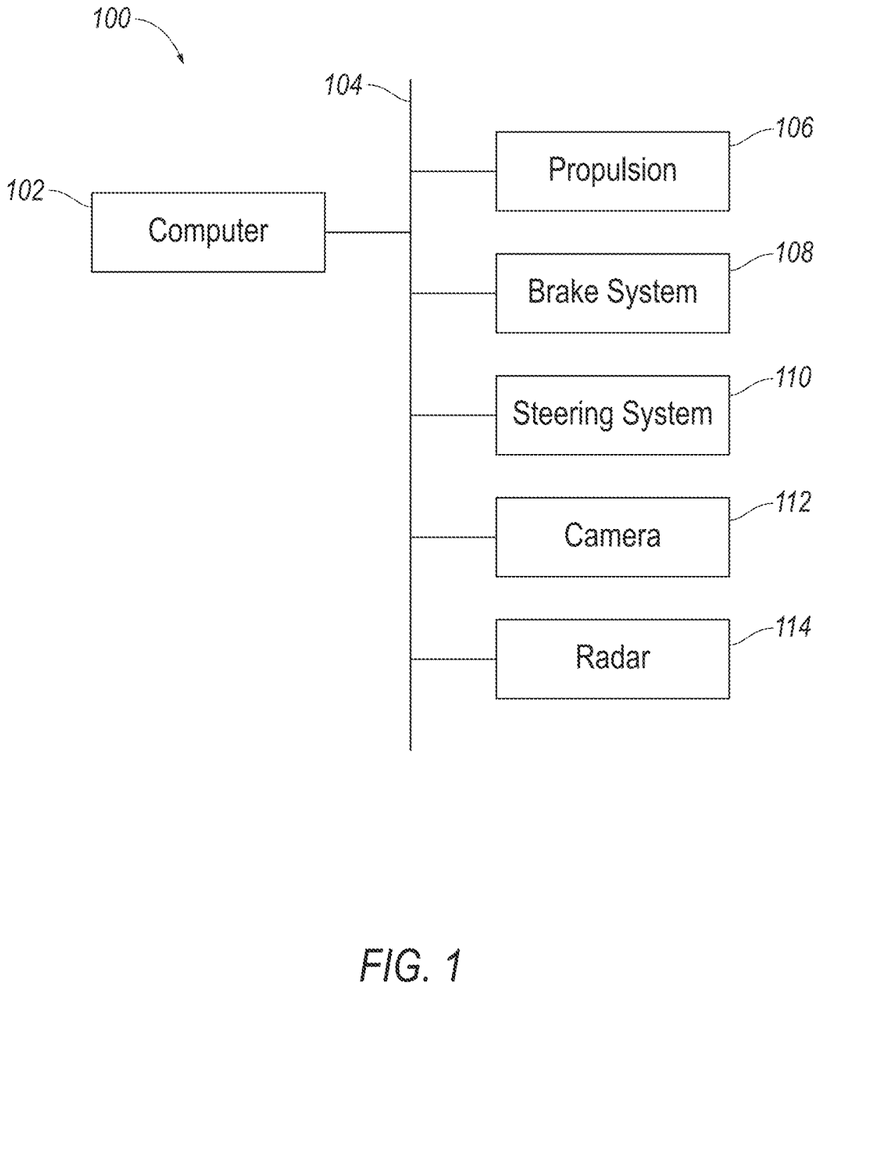
FIG. 1 is a block diagram of an example vehicle with a radar and a camera.

With reference to FIG. 1, the vehicle 100 may be any passenger or commercial automobile such as a car, a truck, a sport utility vehicle, a crossover, a van, a minivan, a taxi, a bus, etc.

The vehicle 100 may be an autonomous or semi-autonomous vehicle. The computer 102 can be programmed to operate the vehicle 100 independently of the intervention of a human operator, completely or to a lesser degree. The computer 102 may be programmed to operate the propulsion 106, brake system 108, steering system 110, and/or other vehicle systems based on data from the camera 112 and radar 114, as well as other sensors. For the purposes of this disclosure, autonomous operation means the computer 102 controls the propulsion 106, brake system 108, and steering system 110 without input from a human operator; semi-autonomous operation means the computer 102 controls one or two of the propulsion 106, brake system 108, and steering system 110 and a human operator controls the remainder; and nonautonomous operation means a human operator controls the propulsion 106, brake system 108, and steering system 110.

The computer 102 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The computer 102 can thus include a processor, a memory, etc. The memory of the computer 102 can include media for storing instructions executable by the processor as well as for electronically storing data and/or databases, and/or the computer 102 can include structures such as the foregoing by which programming is provided. The computer 102 can be multiple computers coupled together.

The computer 102 may transmit and receive data through a communications network 104 such as a controller area network (CAN) bus, Ethernet, WiFi, Local Interconnect Network (LIN), onboard diagnostics connector (OBD-II), and/or by any other wired or wireless communications network. The computer 102 may be communicatively coupled to the camera 112, the radar 114, the propulsion 106, the brake system 108, the steering system 110, and other components via the communications network 104.

The propulsion 106 of the vehicle 100 generates energy and translates the energy into motion of the vehicle 100. The propulsion 106 may be a conventional vehicle propulsion subsystem, for example, a conventional powertrain including an internal-combustion engine coupled to a transmission that transfers rotational motion to wheels; an electric powertrain including batteries, an electric motor, and a transmission that transfers rotational motion to the wheels; a hybrid powertrain including elements of the conventional powertrain and the electric powertrain; or any other type of propulsion. The propulsion 106 can include an electronic control unit (ECU) or the like that is in communication with and receives input from the computer 102 and/or a human operator. The human operator may control the propulsion 106 via, e.g., an accelerator pedal and/or a gear-shift lever.

The brake system 108 is typically a conventional vehicle braking subsystem and resists the motion of the vehicle 100 to thereby slow and/or stop the vehicle 100. The brake system 108 may include friction brakes such as disc brakes, drum brakes, band brakes, etc.; regenerative brakes; any other suitable type of brakes; or a combination. The brake system 108 can include an electronic control unit (ECU) or the like that is in communication with and receives input from the computer 102 and/or a human operator. The human operator may control the brake system 108 via, e.g., a brake pedal.

The steering system 110 is typically a conventional vehicle steering subsystem and controls the turning of the wheels. The steering system 110 may be a rack-and-pinion system with electric power-assisted steering, a steer-by-wire system, as both are known, or any other suitable system. The steering system 110 can include an electronic control unit (ECU) or the like that is in communication with and receives input from the computer 102 and/or a human operator. The human operator may control the steering system 110 via, e.g., a steering wheel.

The camera 112 detects electromagnetic radiation in some range of wavelengths. For example, the camera 112 may detect visible light, infrared radiation, ultraviolet light, or some range of wavelengths including visible, infrared, and/or ultraviolet light. For example, the camera 112 can be a charge-coupled device (CCD), complementary metal oxide semiconductor (CMOS), or any other suitable type.

The radar 114 transmits radio waves and receives reflections of those radio waves to detect physical objects in the environment. The radar 114 can use direct propagation, i.e., measuring time delays between transmission and reception of radio waves, and/or indirect propagation, i.e., Frequency Modulated Continuous Wave (FMCW) method, i.e., measuring changes in frequency between transmitted and received radio waves.

Figure 2:
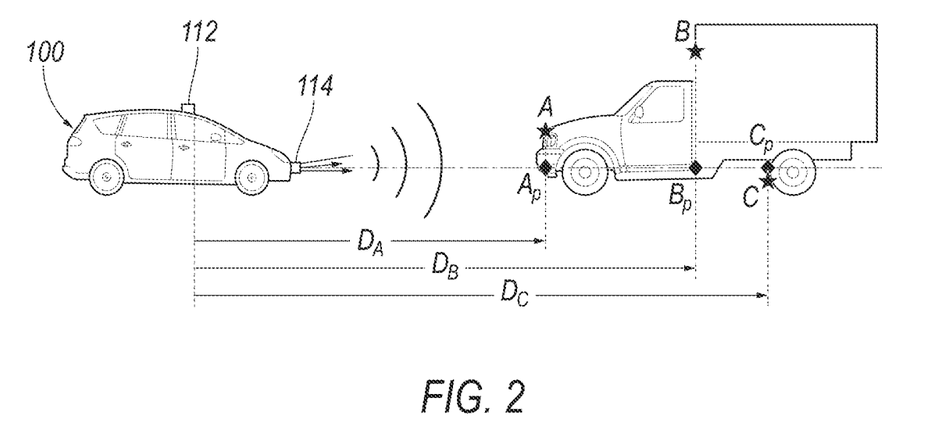
FIG. 2 is a diagrammatic side view of the vehicle and an example object detected by the radar and the camera.

With reference to FIG. 2, the camera 112 and the radar 114 are fixed relative to each other, specifically have fixed positions and orientations relative to each other. For example, the camera 112 can be mounted higher and farther rearward than the radar 114. The camera 112 can be mounted on a roof of the vehicle 100, or on a ceiling of the vehicle 100 inside a windshield. The radar 114 can be mounted to a front bumper of the vehicle 100. The camera 112 and the radar 114 can instead be fixed to other locations of the vehicle 100. The camera 112 and the radar 114 are oriented so that their fields of view overlap. For example, the camera 112 and the radar 114 can both be oriented in a vehicle-forward direction.

Figure 3:
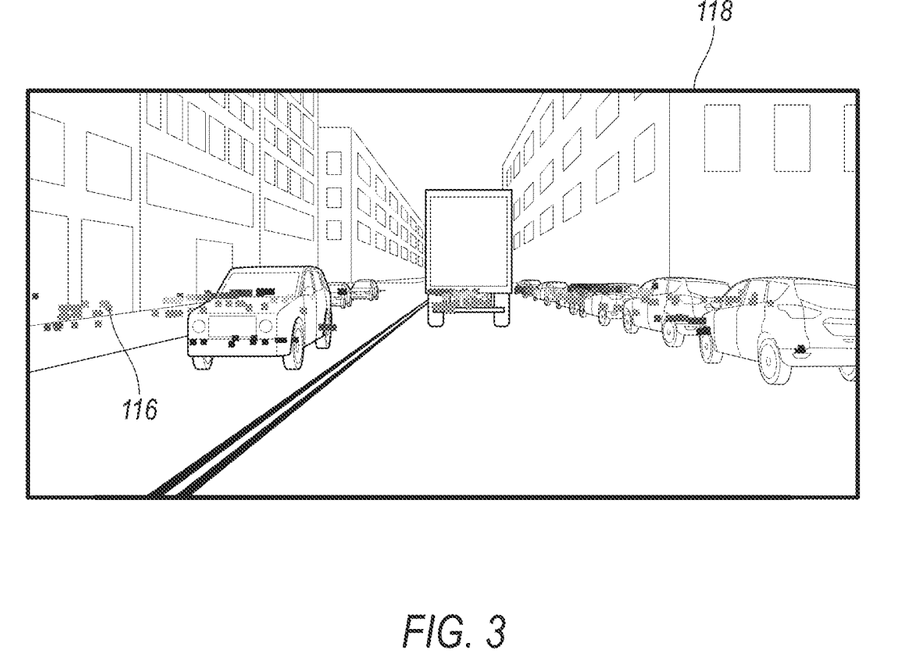
FIG. 3 is an example image frame from the camera with radar pixels from the radar mapped onto the image frame.

With reference to FIG. 3, the camera 112 generates the camera data. The camera data are a plurality, i.e., a sequence of image frames 118 of the field of view of the camera 112. Each image frame 118 is a two-dimensional matrix including camera pixels 120. (In FIG. 3, the camera pixels 120 are shown only in the upper left corners of the image frame 118 and one of the regions 122 because it would be impractical to show them all, but the camera pixels 120 extend across an entirety of the image frame 118.) Each camera pixel 120 has a brightness or color represented as one or more numerical values, e.g., a scalar unitless value of photometric light intensity between 0 (black) and 1 (white), or values for each of red, green, and blue, e.g., each on an 8-bit scale (0 to 255) or a 12- or 16-bit scale. The camera pixels 120 may be a mix of representations, e.g., a repeating pattern of scalar values of intensity for three camera pixels 120 and a fourth camera pixel 120 with three numerical color values, or some other pattern. Position in an image frame 118, i.e., position in the field of view of the camera 112 at the time that the image frame 118 was recorded, can be specified in pixel dimensions or coordinates, e.g., an ordered pair of pixel distances, such as a number of camera pixels 120 from a top edge and a number of camera pixels 120 from a left edge of the image frame 118.

The radar 114 generates the radar data. The radar data include a plurality of radar pixels 116. (In FIG. 3, only one exemplary radar pixel 116 is labeled with a reference number because it would be impractical to label them all, but all the grayscale squares are radar pixels 116.) The radar pixels 116 specify respective positions in the environment relative to the position of the radar 114. For example, the radar data can be in spherical coordinates with the radar 114 at the origin of the spherical coordinate system. The spherical coordinates can include a radial distance, i.e., a measured depth from the radar 114 to the point measured by the radar 114; a polar angle, i.e., an angle from a vertical axis through the radar 114 to the point measured by the radar 114; and an azimuthal angle, i.e., an angle in a horizontal plane from a horizontal axis through the radar 114 to the point measured by the radar 114. The horizontal axis can be, e.g., along a vehicle-forward direction. Alternatively, the radar 114 can return the radar pixels 116 as Cartesian coordinates with the radar 114 at the origin or as coordinates in any other suitable coordinate system, or the computer 102 can convert the spherical coordinates to Cartesian coordinates or another coordinate system. The radar pixels 116 may also include a radial velocity, i.e., a component of the velocity of the point measured by the radar 114 toward or away from the radar 114.

The radar data can be single-row data, i.e., the radar pixels 116 can be arranged in a horizontal sequence and not vertically stacked. Even if the radar pixels 116 are arranged in a single row, the radar pixels 116 can be at different heights or polar angles, as seen in FIG. 3. (FIG. 3 shows the radar pixels 116 that have accumulated over a time interval.) The radar pixels 116 are sparser than the camera pixels 120. For example, the radar pixels 116 can be a single row rather than multiple rows like the camera pixels 120, and the radar pixels 116 can be sparser horizontally than the camera pixels 120 are.

FIG. 3 shows the radar pixels 116 after being mapped to the image frame 118. For example, the computer 102 can map the radar pixels 116 to the image frame 118 by first applying a known geometric transformation from the reference frame of the radar 114 to the reference frame of the camera 112:

$$^C q = {_R^C}T {^R q}$$

in which q is a 4-element vector ($x_q$, $y_q$, $z_q$, 1) representing a point in the environment, the left superscript C indicates the reference frame of the camera 112, the left superscript R represents the reference frame of the radar 114, and $_R^C T$ is a 4×4 transformation matrix from the reference frame R of the radar 114 to the reference frame C of the camera 112. The transformation matrix $_R^C T$ is known in advance based on the relative positions of the camera 112 and the radar 114 and is stored in the computer 102. The vector q can be represented in Cartesian coordinates in which, relative to the direction that the camera 112 or radar 114 is oriented, the X-axis extends leftward, the Y-axis extends upward, and the Z-axis extends forward, i.e., the depth is measured along the Z-axis. The first two elements of the vector $^C q$, i.e., the vertical and lateral components of the vector $^C q$ relative to the direction in which the camera 112 is oriented, can be shifted and/or scaled by known constants to arrive at the pixel coordinates (i, j) of the radar pixel 116. The constants for the shifting and/or scaling are based on the physical properties of the camera 112.

Returning to FIG. 2, mapping the radar pixels 116 to the image frame 118 using the transformation matrix can result in the radar pixels 116 being located at camera pixels 120 corresponding to objects having a different depth than the radar pixels 116. For example, a radar pixel 116 can have a depth corresponding to camera pixels 120 that are nearby but spaced from the location of the radar pixel 116 in the image frame 118. For another example, a radar pixel 116 can have a depth that does not correspond to the camera pixels 120 in the image frame 118, e.g., if the radar pixel 116 is of an object occluded from the image frame 118. In the example of FIG. 2, the radar 114 can detect points A, B, and C, shown in FIG. 2, having respective depths $D_A$, $D_B$, and Dc. The radar pixels 116 corresponding to points A, B, and C are mapped using the transformation matrix to camera pixels 120 corresponding to points $A_p$, $B_p$, and $C_p$. The actual depth from the camera 112 to point $A_p$ is approximately the same as the depth of the radar pixel 116 of point A. The actual depth from the camera 112 to point $B_p$ is different than the depth of the radar pixel 116 corresponding to point B, but the actual depth from the camera 112 to point B is the same as the depth of the radar pixel 116 corresponding to point B. The actual depth from the camera 112 to point $C_p$ is different than the depth of the radar pixel 116 corresponding to point C, and the camera 112 is occluded from detecting any nearby camera pixels 120 corresponding to points with an actual depth from the camera 112 approximately the same as the depth of the radar pixel 116 corresponding to point C.

Figure 4:
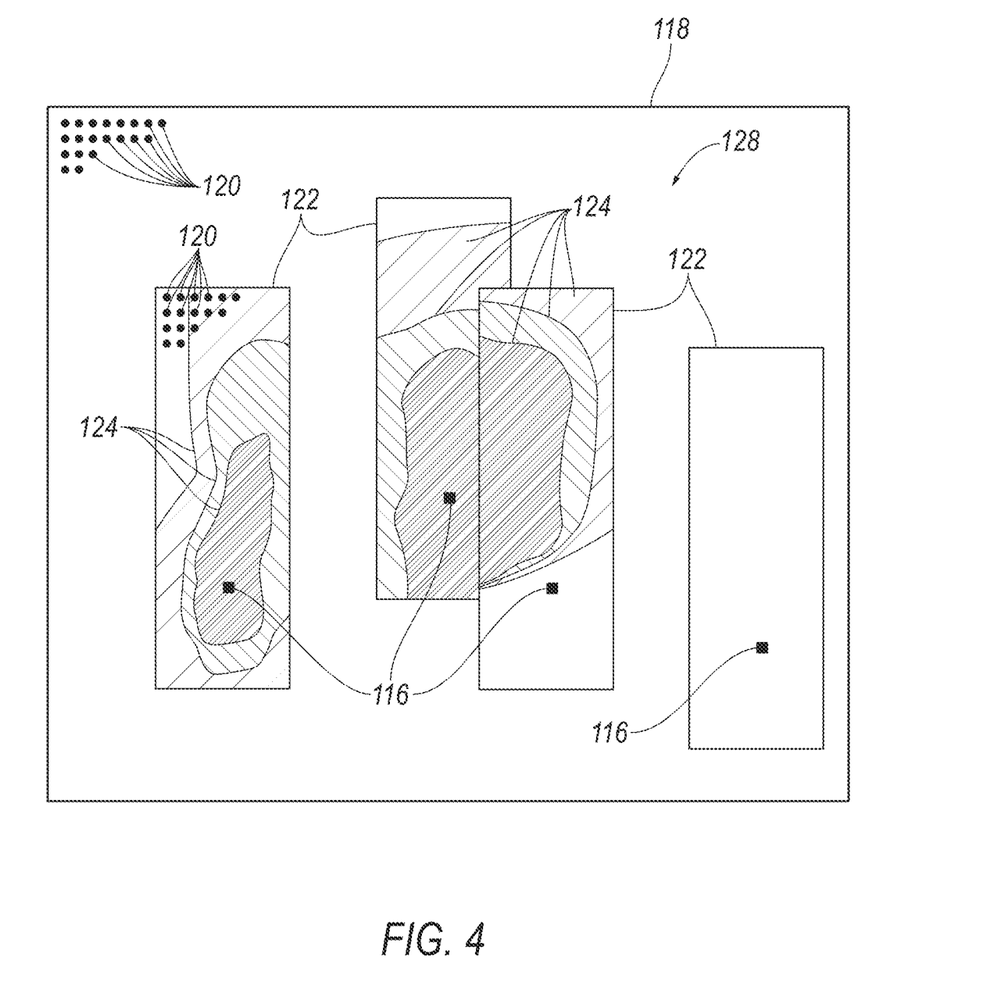
FIG. 4 is a diagram of example regions surrounding the radar pixels in the image frame and a plurality of example depth images superimposed on the image frame.

With reference to FIG. 4, after mapping the radar pixels 116 to the image frame 118, the computer 102 generates regions 122 of the image frame 118 surrounding the respective radar pixels 116, i.e., one region 122 for each radar pixel 116. Each region 122 is a contiguous subset of the image frame 118. Each region 122 has a preset position and preset shape relative to the respective radar pixel 116. The preset position of the region 122 includes the radar pixel 116 within the region 122, e.g., is horizontally centered on the radar pixel 116. The preset shape relative to the radar pixel 116 can have a greater height than width, which accounts for the radar data having a greater vertical sparsity, e.g., by being a single row. The preset shape can extend a greater distance vertically upward than downward from the respective radar pixel 116, which accounts for objects of interest potentially being a greater distance above a height of the radar 114 than below the height of the radar 114, in part because the objects cannot be below the ground on which the vehicle 100 is traveling. For example, the preset shape can be an h×w rectangle, in which h is a vertical distance in units of camera pixels 120 along the image frame 118 and w is a horizontal distance in units of camera pixels 120 along the image frame 118, with h>w. Relative to the respective radar pixel 116, the preset shape of the region 122 can extend a distance w/2 to the left and to the right of the radar pixel 116, and the preset shape can extend a distance $h_{up}$ above the radar pixel 116 and a distance $h_{down}$ below the radar pixel 116, with $h_{up}+h_{down}=h$ and $h_{up}>h_{down}$.

The computer 102 determines confidence scores for the respective camera pixels 120 in each region 122. The confidence scores indicate a confidence that the respective camera pixels 120 have the same depth as the radar pixel 116 for the same region 122. The confidence score can be represented as a function A(i, j, k), in which (i, j) are the pixel coordinates of the radar pixel 116 and k is an index of the camera pixels 120 in the region 122 surrounding that radar pixel 116. The index k of the camera pixels 120 has a range [1, . . . N], in which N is the total number of camera pixels 120 in a region 122, e.g., N=h×w for the rectangular preset shape for the regions 122 shown in FIG. 4. Each camera pixel 120 in a region 122 is assigned the depth d(i, j) of the radar pixel 116 for that region 122 and a confidence score A(i, j, k). For camera pixels 120 inside multiple regions 122, i.e., when regions 122 overlap, the camera pixel 120 is given the depth of the radar pixel 116 for which the confidence score is higher. As will now be described, determining the confidence scores includes executing a first trained network, e.g., a neural network or other machine-learning program.

The first trained network takes inputs from the camera data and the radar data. The inputs to the first trained network include the radar pixels 116, the image frame 118, optical flow, and radar flow. The optical flow describes a scene shift, i.e., differences in pixel coordinates corresponding to respective points in space, between the image frame 118 taken as input, which will be referred to as a first image frame 118, and a second image frame 118. The second image frame 118 can be from a different, nearby point in time from the first image frame 118. The second image frame 118 can be from before or after the first image frame 118. For example, for a target observed in the first and second image frames 118, the optical flow gives a mapping from the pixel coordinates in the earlier of the two image frames 118 to the pixel coordinates in the later of the two image frames 118, e.g., Flow($(i_1,j_1)$)→$(i_2,j_2)$. The optical flow can be determined using known image-processing techniques for scene flow for images. Similarly, the radar flow describes shifting between the radar data at two points in time and can be determined using known techniques for scene flow for radar data. The image frame 118 and the optical flow can be taken at a point in time, and the radar pixels 116 and the radar flow can be accumulated over a time interval including the point in time. The time interval can be chosen to be short while providing sufficient radar data for the first trained network to achieve accurate results, e.g., 0.3 seconds. The radar data can be transformed to the point in time of the image frame 118 using the motion of the vehicle 100 and/or radial velocity from the radar data, in order to compensate for the motion of the vehicle 100 and of objects in the environment. The accumulation of the radar data over the time interval compensates for the relative sparsity of the radar data compared to the camera data.

The first trained network outputs the confidence scores A(i, j, k). The confidence score A(i, j, k) of the kth camera pixel 120 in a region 122 indicates confidence in applying the measured depth d(i, j) of the radar pixel 116 located at (i, j) for that region 122 to the kth camera pixel 120. The greater the confidence score A(i, j, k), the closer the measured depth d(i, j) is likely to be to the true depth of the camera pixel 120. For example, the computer 102 can apply a Sigmoid function to a raw output z(i, j, k) of the first trained network to obtain the confidence score A(i,j, k) that is in a range of 0 to 1.

The combination of inputs can be used for generating the confidence scores A(i, j, k). The image frame 118 provides scene context for each radar pixel 116, as well as boundary information for objects. The radar pixels 116 provide depth for interpreting the context of the image frame 118 and a basis for predicting the depth of nearby camera pixels 120. The pairing of the optical flow and the radar flow provides cues for occlusion and for depth difference, which can occur as a result of mapping the radar pixels 116 to the image frame 118 as described above with respect to FIG. 2. A smaller difference between the optical flow and the radar flow at a given camera pixel 120 increases a likelihood of the first trained network determining a higher confidence score A(i, j, k) for that camera pixel 120. For static objects, the optical flow should equal the radar flow when the depth of the camera pixel 120 is the same as the depth of the corresponding radar pixel 116. Conversely, a radar pixel 116 that is occluded from the field of view of the camera 112 will have a radar flow that is different than the optical flow of a static object occluding the radar pixel 116.

The first trained network can be any suitable type of network for converting the inputs to the outputted confidence scores A(i, j, k). For example, the first trained network can be a convolutional neural network, which is well suited to analyzing visual imagery. A convolutional neural network includes a series of layers, with each layer using the previous layer as input. Each layer contains a plurality of neurons that receive as input data generated by a subset of the neurons of the previous layers and generate output that is sent to neurons in the next layer. Types of layers include convolutional layers, which compute a dot product of a weight and a small region of input data; pool layers, which perform a downsampling operation along spatial dimensions; and fully connected layers, which generate based on the output of all neurons of the previous layer. The final layer of the convolutional neural network outputs the raw output z(i, j, k). Alternatively or additionally, the first trained network can be an encoder-decoder network, e.g., with skip connections. Encoder-decoder networks with skip connections perform well at image segmentation and are thus well suited to using the camera data to assign the confidence scores A(i, j, k) to particular camera pixels 120.

The first trained network can be trained on a training set including camera data, radar data, and ground-truth depths corresponding to the camera data and radar data. For example, the training set can include LIDAR data paired with the camera data and radar data, and the LIDAR data can be used as ground truth. The LIDAR data can be accumulated over a short time interval to increase the density of the depths returned by the LIDAR data, which can result in a more accurate trained network. The LIDAR data can also be processed in other ways to form the training set, such as using the scene flow of LIDAR points, semantic segmentation, and/or 3D bounding boxes to remove LIDAR points that are occluded from the camera data in the training set. These types of processing can make the LIDAR data more accurate.

The first trained network can be trained on the training set by minimizing a loss function. One element of the loss function is a label for each camera pixel 120 in a region 122 according to whether the depth of the radar pixel 116 for that region 122 is within a threshold of the ground-truth depth of that camera pixel 120, e.g.:

$$A_{tr}(i, j, k) = \begin{cases} 1, & \text{if } (|E_{ijk}| < T_a) \wedge (|\overline{E}_{ijk}| < T_r) \\ 0, & \text{otherwise} \end{cases}$$

in which $E_{ijk}$ is the difference between the depth of the radar pixel 116 at (i, j) and the ground-truth depth of the kth camera pixel 120; $T_a$ is a threshold for the depth difference $E_{ijk}$; $\overline{E}_{ijk}$ is the relative depth difference scaled to the depth of the radar pixel 116, i.e., $\overline{E}_{ijk} = E_{ijk}/d(i, j)$; and $T_r$ is a threshold for the relative depth difference $\overline{E}_{ijk}$. In other words, the label is 1 if the depth difference and the relative depth difference between the depth of the radar pixel 116 and the ground-truth depth of the camera pixel 120 are smaller than respective thresholds, and the label is 0 otherwise. The thresholds $T_a$ and $T_r$ can be chosen to accommodate a margin of error of the radar 114. Alternatively, the label $A_{tr}(i, j, k)$ can depend only on whether the depth difference $E_{ijk}$ is less than the threshold $T_a$ or only on whether the relative depth difference $\overline{E}_{ijk}$ is less than the threshold $T_r$. The loss function being minimized can be the weighted binary cross-entropy loss between the labels $A_{tr}(i, j, k)$ and a raw network output z(i, j, k):

$$L_{CE} = \sum_{i,j,k} w(i, j, k)\left[-A_{tr}(i, j, k)z(i, j, k) + \log\left(1 + e^{z(i,j,k)}\right)\right]$$

in which w(i, j, k) is a binary weight indicating whether there is both a radar pixel 116 at (i, j) and a ground-truth depth for the kth camera pixel 120. The binary weight w(i, j, k) equals 1 if both conditions are true and 0 if not. The raw network output z(i, j, k) can be converted to the confidence score A(i, j, k) by applying a Sigmoid function, i.e.:

$$A(i, j, k) = \frac{1}{1 + e^{-z(i,j,k)}}$$

As will be described below, the computer 102 uses the confidence scores A(i, j, k) to generate a plurality of depth images 124 corresponding to respective confidence thresholds. The confidence thresholds are preset, e.g., are constants stored by the computer 102. The confidence thresholds are mutually different, i.e., each confidence threshold is different from the other confidence thresholds, i.e., none of the confidence thresholds are equal to each other. The confidence thresholds can be chosen to provide sufficient data for a second trained network to perform depth completion as described below, e.g., 0.95, 0.9, 0.8, 0.7, 0.6, and 0.5. The number of the plurality of depth images 124, and thus the number of the confidence thresholds, is preset, e.g., a certain number of different confidence thresholds is stored in the computer 102. The number of confidence thresholds is chosen to provide sufficient data for the second trained network to perform depth completion as described below, e.g., six.

The computer 102 generates the depth images 124 corresponding to the respective confidence thresholds, i.e., generates a depth image 124 for each confidence threshold, e.g., six depth images 124: one each for confidence thresholds of 0.95, 0.9, 0.8, 0.7, 0.6, and 0.5. Each depth image 124 indicates depths for the camera pixels 120 having confidence scores above the confidence threshold of that depth image 124. In other words, for each camera pixel 120 in one of the depth images 124, the depth is the depth of the radar pixel 116 for the region 122 in which the camera pixel 120 is located if the confidence score of the camera pixel 120 is above the confidence threshold, and the camera pixel 120 lacks a value for depth if the confidence score of the camera pixel 120 is below the confidence threshold. If a camera pixel 120 is in multiple regions 122, the camera pixel 120 is assigned to the region 122 for which the camera pixel 120 has the higher confidence score. As shown in FIG. 4, the depth images 124 can be represented as a multichannel depth image 128, with each depth image 124 being one channel. The number of channels is the same as the number of depth images 124 or confidence thresholds, e.g., six, of which three are shown in FIG. 4.

Figure 5:
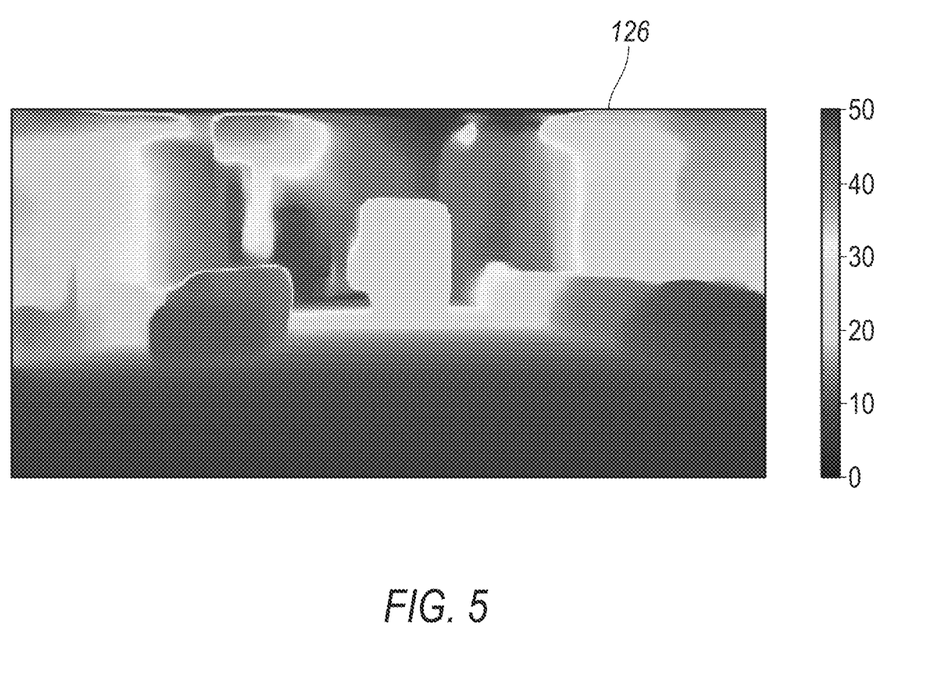
FIG. 5 is an example depth map.

With reference to FIG. 5, the computer 102 outputs a depth map 126 of projected depths for the respective camera pixels 120. The depth map 126 can include a depth for each camera pixel 120. The computer 102 outputs the depth map 126 based on the confidence scores. For example, the computer 102 outputs the depth map 126 based on the depth images 124, which are generated based on the confidence scores as described above. As will now be described, outputting the depth map 126 includes executing a second trained network.

The second trained network takes inputs from the camera data, the radar data, and the first trained network. The inputs to the second trained network include the radar pixels 116, the image frame 118, and the depth images 124.

The second trained network outputs the depth map 126, i.e., performs depth completion. The depth map 126 includes a depth for each camera pixel 120, meaning that the depth map 126 is dense. The depths are not limited to the depths of the radar pixels 116. The depths can blend along surfaces of objects that extend toward or away from the vehicle 100.

The second trained network can be any suitable type of network for performing depth completion, e.g., such as are known, e.g., a guided convolutional neural network.

The second trained network can be trained on a training set including camera data, radar data, and ground-truth depths corresponding to the camera data and radar data. For example, the training set can include LIDAR data paired with the camera data and radar data, processed as described above with respect to the first trained network, and the LIDAR data can be used as ground truth.

Figure 6:
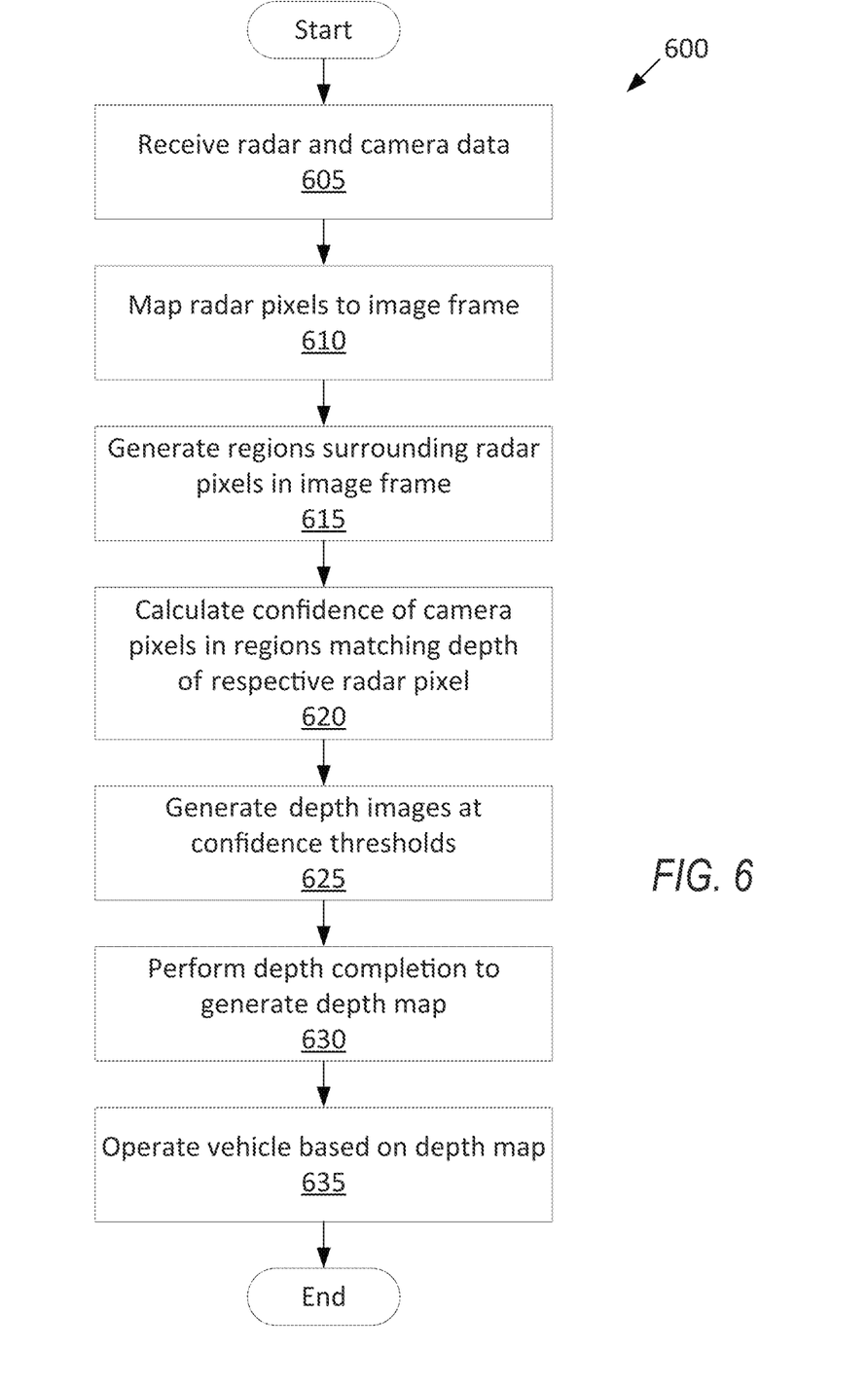
FIG. 6 is a process flow diagram of an example process for generating the depth map and operating the vehicle based on data from the camera and the radar.

FIG. 6 is a process flow diagram illustrating an exemplary process 600 for generating the depth map 126 and operating the vehicle 100 based on the depth map 126. The memory of the computer 102 stores executable instructions for performing the steps of the process 600 and/or programming can be implemented in structures such as mentioned above. The computer 102 can execute the process 600 continuously when the vehicle 100 is on. As a general overview of the process 600, the computer 102 receives the camera data and the radar data, maps the radar pixels 116 to the image frame 118, generates the regions 122 surrounding the radar pixels 116 in the image frame 118, determines the confidence scores of the camera pixels 120, generates the depth images 124, outputs the depth map 126, and operates the vehicle 100 based on the depth map 126.

The process 600 begins in a block 605, in which the computer 102 receives the camera data from the camera and the radar data from the radar 114. The radar data includes the radar pixels 116 having measured depths, as described above. The camera data includes the image frame 118 including the camera pixels 120, as described above.

Next, in a block 610, the computer 102 maps the radar pixels 116 to the image frame 118, e.g., using the transformation matrix $_R^CT$ as described above.

Next, in a block 615, the computer 102 generates the regions 122 of the image frame 118 surrounding the respective radar pixels 116, as described above and shown in FIG. 4.

Next, in a block 620, the computer 102 determines the confidence scores A(i, j, k) for the camera pixels 120 in the regions 122 by executing the first trained network, as described above.

Next, in a block 625, the computer 102 generates the depth images 124 using the confidence scores A(i, j, k), as described above.

Next, in a block 630, the computer 102 outputs the depth map 126 by executing the second trained network with the depth images 124 as inputs, as described above.

Next, in a block 635, the computer 102 operates the vehicle 100 based on the depth map 126. For example, the computer 102 can actuate at least one of the propulsion 106, the brake system 108, or the steering system 110. For example, the computer 102 may actuate the steering system 110 based on the depth map 126 as part of a lane-keeping assist feature, e.g., based on the depth map 126 including a curb or shoulder defining an edge of a lane. For another example, the computer 102 may actuate the brake system 108 based on the depth map 126 as part of an automatic-braking feature, e.g., braking to prevent the vehicle 100 from contacting an object in the environment. For another example, the computer 102 may operate the vehicle 100 autonomously, i.e., actuating the propulsion 106, the brake system 108, and the steering system 110 based on the depth map 126, e.g., to navigate the vehicle 100 around objects in the environment. After the block 635, the process 600 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc.

have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. The adjectives "first" and "second" are used throughout this document as identifiers and are not intended to signify importance, order, or quantity.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A computer comprising a processor and a memory storing instructions executable by the processor to:
   receive radar data from a radar, the radar data including radar pixels, each radar pixel having a measured depth;
   receive camera data from a camera, the camera data including an image frame including camera pixels;
   map the radar pixels to the image frame;
   generate regions of the image frame, each region surrounding a corresponding one of the radar pixels;
   for each region, determine a plurality of confidence scores corresponding to different ones of the camera pixels in that region, each confidence score indicating confidence in applying the measured depth of the radar pixel for that region to that camera pixel; and
   output a depth map of projected depths corresponding to the camera pixels based on the confidence scores.

2. The computer of claim 1, wherein the instructions further include instructions to operate a vehicle including the radar and the camera based on the depth map.

3. The computer of claim 1, wherein the instructions further include instructions to generate a plurality of depth images, each depth image corresponding to a confidence threshold, each depth image indicating depths for the camera pixels that have confidence scores above the confidence threshold of that depth image.

4. The computer of claim 3, wherein outputting the depth map is based on the depth images.

5. The computer of claim 4, wherein outputting the depth map includes executing a trained network, and inputs to the trained network include the radar pixels, the image frame, and the depth images.

6. The computer of claim 3, wherein the confidence thresholds are preset and mutually different.

7. The computer of claim 3, wherein a number of the plurality of depth images is preset.

8. The computer of claim 1, wherein determining the confidence scores includes executing a trained network.

9. The computer of claim 8, wherein inputs to the trained network include the radar pixels, the image frame, optical flow, and radar flow.

10. The computer of claim 9, wherein a smaller difference between the optical flow and the radar flow at a first camera pixel of the camera pixels increases a likelihood of the trained network determining a higher confidence score for the first camera pixel.

11. The computer of claim 9, wherein the radar pixels and the radar flow are accumulated over a time interval.

12. The computer of claim 11, wherein the image frame is a first image frame, the camera data includes a second image frame, and the optical flow represents a scene shift between the first image frame and the second image frame.

13. The computer of claim 8, wherein the trained network is a convolutional neural network.

14. The computer of claim 1, wherein each region has a preset position in the image frame relative to the radar pixel corresponding to that region.

15. The computer of claim 14, wherein each region is a preset shape in the image frame, and the preset shape has a greater height than width.

16. The computer of claim 14, wherein each region is a preset shape in the image frame, and each preset shape extends a greater distance vertically upward than downward from the radar pixel corresponding to that region.

17. The computer of claim 1, wherein outputting the depth map includes executing a trained network.

18. The computer of claim 1, wherein the radar data is single-row data.

19. The computer of claim 1, wherein the radar pixels after mapping to the image frame are sparser horizontally across the image frame than the camera pixels are.

20. A method comprising:
   receiving radar data from a radar, the radar data including radar pixels, each radar pixel having a measured depth;
   receiving camera data from a camera, the camera data including an image frame including camera pixels;
   mapping the radar pixels to the image frame;
   generating regions of the image frame, each region surrounding a corresponding one of the radar pixels;
   for each region, determining a plurality of confidence scores corresponding to different ones of the camera pixels in that region, each confidence score indicating confidence in applying the measured depth of the radar pixel for that region to that camera pixel; and
   outputting a depth map of projected depths corresponding to the camera pixels based on the confidence scores.

* * * * *